United States Patent [19]

Massarani

[11] Patent Number: 5,026,075
[45] Date of Patent: Jun. 25, 1991

[54] RADIAL SEAL

[75] Inventor: Madhat Massarani, Heathrow, Fla.

[73] Assignee: Westinghouse Electric Corp., Pittsburgh, Pa.

[21] Appl. No.: 310,991

[22] Filed: Feb. 16, 1989

[51] Int. Cl.$^5$ ............................................. F16J 15/447
[52] U.S. Cl. ..................................... 277/56; 277/192; 415/174.5
[58] Field of Search ....................... 277/53, 55, 56, 57; 415/172.5, 174.5

[56] References Cited

U.S. PATENT DOCUMENTS

| 949,440 | 2/1910 | Richardson et al. | 415/174.5 X |
|---|---|---|---|
| 1,419,927 | 6/1922 | Hodgkinson | 277/56 |
| 1,857,961 | 5/1932 | Lamb | 277/57 X |
| 2,242,673 | 5/1941 | Hanzlik | 277/57 |
| 2,279,863 | 4/1942 | Downer | 415/174.5 X |
| 3,377,075 | 4/1968 | Feller | 277/53 X |

FOREIGN PATENT DOCUMENTS

| 484540 | 8/1924 | Fed. Rep. of Germany | 277/53 |
|---|---|---|---|
| 494742 | 3/1930 | Fed. Rep. of Germany | 277/56 |
| 195433 | 4/1923 | United Kingdom | 277/53 |
| 724316 | 2/1955 | United Kingdom | 277/56 |

Primary Examiner—Allan N. Shoap

[57] ABSTRACT

A radial labyrinth seal includes a foot portion which is inserted into a groove in a stationary member, and a radially extending portion with a tip or periphery which is spaced apart from a rotating body by a small gap. In accordance with one embodiment, the radial labyrinth seal includes a carrier ring having a slot in one side, and a rider ring having a foot portion which fits into the slot of the carrier ring, the rider ring providing the radially extending portion. In another embodiment, slots are provided on both sides of the carrier ring, and rider seal elements are mounted in the slots with caulking rings. While the seal of the invention may be used in original equipment, it is particularly adapted for use as a replacement seal in equipment which previously employed an axial labyrinth sealing arrangement.

18 Claims, 6 Drawing Sheets

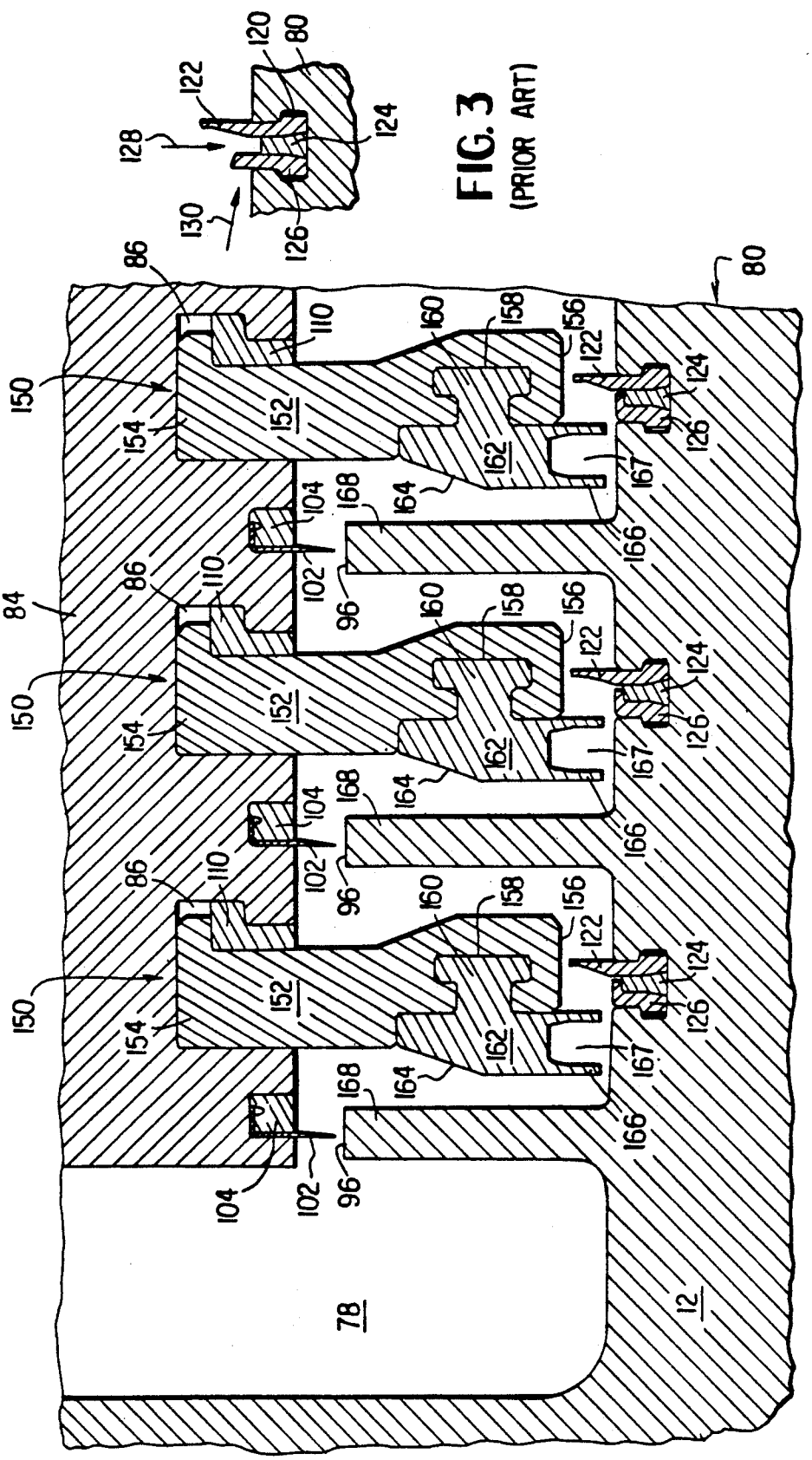

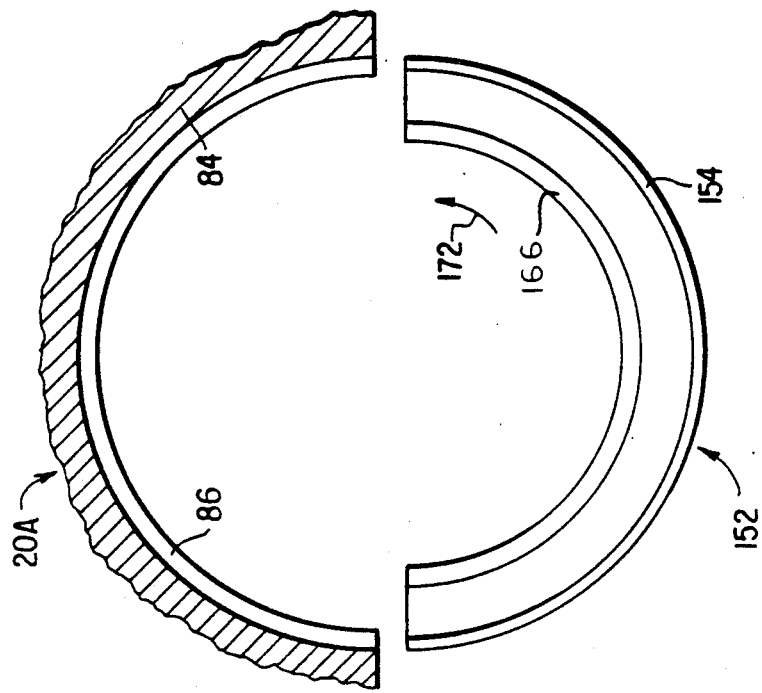
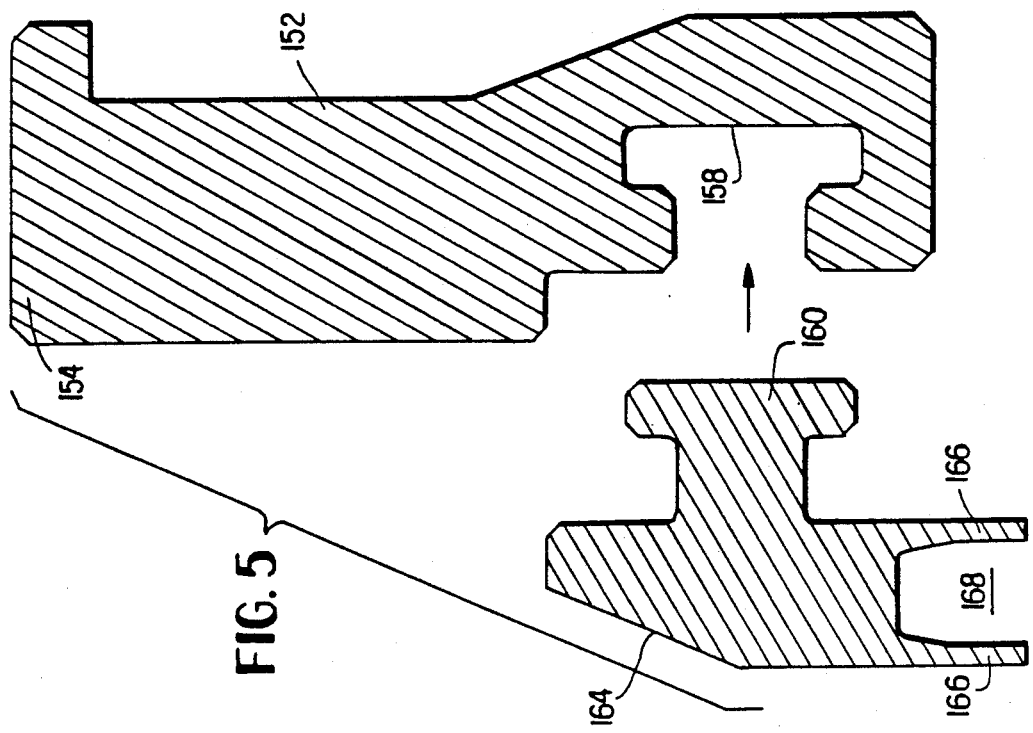

RADIAL SEAL

BACKGROUND OF THE INVENTION

This invention is directed to a seal for use with rotating members such as shafts, and more particularly to a labyrinth seal having radially disposed sealing elements. The invention is also directed to a method for installing the seal in equipment, and particularly to a method for installing the seal as a replacement for an axial labyrinth sealing arrangement originally present in equipment such as a steam turbine.

FIGS. 1A and 1B illustrates portions of a conventional high pressure turbine 10. Turbine 10 includes a rotor 12 having end portions which are configured as shaft ends 14 and 16. Rotor 12 also has an axial bore, as illustrated, to remove impurities which collect along the axis during forging of the rotor and to permit inspection for imperfections. Shaft ends 14 and 16 are rotatably supported by bearings 18. Turbine 10 also includes a housing, known as a "cylinder" in the turbine art due to its generally cylindrical configuration. Reference number 20 identifies the cylinder of turbine 10. Cylinder 20 includes an upper shell 20A and a lower shell 20B, which are connected by bolts (not illustrated).

During operation, superheated steam from a boiler (not illustrated) or steam generator (not illustrated) is conveyed via control valves (not illustrated) to inlet pipes 22, which empty into cavity 24 within cylinder 20. A channel 26 conveys the superheated steam to a cavity 28. Superheated steam escapes from cavity 28 through apertures in an annular nozzle plate 30 which is affixed to cylinder 20. A stator wheel 32 having fan-type blades is also affixed to cylinder 20. Rotor 12 has annular grooves (blade roots 34) with a latching configuration to retain a pair of rotor wheels 36, one on either side of fixed stator wheel 32. Rotor wheels 36 have fan-type blades which are oriented in a direction opposite from the orientation of the blades of stator wheel 32. Nozzle plate 30 and the stator and rotor wheels 32 and 34 are known collectively as a control stage, identified in FIG. 1 by reference number 38. Superheated steam escaping outward from cavity 28 through nozzle plate 30 first encounters the inner rotor wheel 36 and thereby imparts an impulse to rotor 12. After the direction of the steam is corrected by fixed stator wheel 32, the steam encounters the second rotor wheel 36 and imparts an additional impulse to rotor 12. The steam entering expansion chamber 40, while still superheated, nevertheless has a pressure and temperature significantly less than the pressure and temperature of the steam in cavity 28. Control stage 38 extracts mechanical energy from the steam.

A blade ring 42 is affixed to cylinder 20 and supports a plurality of stator wheels 44, which are interleaved with rotor wheels 46 affixed to rotor 12. Similarly, blade ring 48 is affixed to cylinder 20 and supports additional stator wheels which are interleaved with additional rotor wheels mounted on rotor 12, and blade ring 50 is affixed to cylinder 20 and supports further stator wheels which are interleaved with further rotor wheels mounted on rotor 12. It will be apparent that the pressure in first intermediate annular cavity 52 is less than the pressure in expansion chamber 40; that the pressure in second intermediate annular cavity 54 is less than the pressure in first intermediate cavity 52; and that the pressure is reduced again before the still-superheated steam reaches annular exhaust cavity 56. The steam in exhaust cavity 56 is emitted from turbine 10 via an exhaust port 58. A conduit 60 (illustrated only schematically) connects exhaust cavity 56 to an annular forward cavity 62, thereby maintaining the pressure in cavity 62 at substantially the same reduced level as in exhaust cavity 56. Labyrinth seal 6 is provided between shaft 14 and the rear end plate of cylinder 20, and a labyrinth seal 66 is provided between shaft 16 and the front end plate of cylinder 20.

A typical power plant in which turbine 10 may be used will now be described. Shaft 14 is connected by a coupling 68 to the shaft 70 of a low pressure turbine (not illustrated) which receives the steam from exhaust port 58. The other end of shaft 70, after emerging from the low-pressure turbine, is coupled, to an electrical generator (not illustrated). At the front end of turbine 10, shaft 16 is connected by a coupling 72 to the shaft 74 of a pump (not illustrated) which supplies lubricating oil to the bearing. A thrust bearing (not illustrated) maintains the axial location of the rotor with respect to the cylinder and transmits axial forces on the rotor to the plant foundation.

With continuing reference to FIG. 1, a narrow passage 76 exists in the region of control stage 38 between the rotating and stationary elements, this passage being exposed to high pressure, high temperature steam. Passage 76 leads to a high pressure annular cavity 78 at the left (in FIG. 1A) of a portion of rotor 12 known in the art as a "high pressure dummy," identified in FIG. 1B with reference number 80. Dummy 80 has a plurality of annular seal projections 82. Facing dummy 80, cylinder 20 is provided with a high pressure seal mounting portion 84 having annular grooves 86. Seal members which cooperate with dummy 80 are not illustrated in FIG. 1, but will be discussed below in conjunction with FIG. 2. To the right (in FIG. 1B) of dummy 80 is an intermediate pressure annular cavity 87, followed by a low pressure dummy 88 of rotor 12. Annular seal projections 90 extend toward a low pressure seal mounting portion 92 of cylinder 20. Portion 92 is provided with annular grooves 94 for mounting seal members, which are not illustrated in FIG. 1 but which will be discussed in conjunction with FIG. 2.

Turning next to FIG. 2, it will be seen that the seal projections 82 extending from high pressure dummy 80 have peripheral edge portions 96 and stepped side portions 98. In addition to the annular grooves 86, high pressure seal mounting portion 84 has annular grooves 100 which were not illustrated in FIG. 1 because of its reduced size. Seal members 102 are lodged into grooves 100 by caulking rings 104 (although not shown, grooves 100 have undercut regions in the manner of grooves 86 and rings 104 extend into the undercut regions). The tips or apex peripheries of seal members 102 are spaced apart from portions 96 by narrow gaps, typically about 20–30 mils (about 0.5 mm–0.8 mm). Seal rings 106 have foot portions 108 which are lodged into the annular grooves 86 by caulking rings 110. Seal rings 106 also have annular grooves 112, and an inner peripheral surface 114. Seal members 116 are wedged into grooves 112 by caulking rings 118. When they are in good condition, the tips or apex peripheries of seal members 116 are spaced apart from stepped side portion 98 by about 20–30 mils (about 0.5 mm–0.8 mm).

Between the seal projections 82, dummy 80 has annular grooves 120. Annular seal members or elements 122 are wedged into grooves 120 by caulking elements 124 and retainer rings 126. The tip or apex periphery of a seal element 122 is spaced apart from surface 114 by 20-30 mils (about 0.5 mm-0.8 mm). As is shown in FIG. 3, during installation seal element 122 and retainer ring 126 are first inserted into groove 120. Caulking element 124 is then pounded between them in the direction of arrow 128. Thereafter the projecting portion of retainer ring 126 is bent in the direction of arrow 130 to achieve the configuration illustrated in FIG. 2, which prevents element 124 from being dislodged due to centrifical force as the rotor 12 rotates. The rotor 12 of the specific turbine 10 shown in FIG. 1 has a maximum diameter of 21¼ inches (54 cm) and rotates at 3600 rpm during normal operation, and it will be appreciated that the centrifugal force is substantial.

Returning to FIG. 2, although the members 102 and the seal elements 122 extend in the radial direction with respect to the axis of rotor 12 (FIG. 1), the sealing arrangement shown in this figure is nevertheless known as an "axial clearance labyrinth seal assembly" because more than half of the sealing effect is provided by seal members 116, which extend axially.

Referring next to FIGS. 1 and 2 together, although an axial clearance labyrinth seal assembly has been described in detail only for high pressure dummy 80, an axial clearance labyrinth seal assembly is also employed at low pressure dummy 88. The only difference is that the radius of the various elements is larger at low pressure dummy 88, and the number of seal projections 90 (and the associated seal rings and sealing elements, as discussed with respect to FIG. 2) is less.

Since the various rotor wheels mounted on rotor 12 in FIG. 1 have fan-type blades, a torque is exerted on rotor 12 as the steam moves through turbine 10. However, the rotor wheels can also be likened to porous pistons, which are responsive to pressure differences. The pressure drop which occurs between gap 76 and cavity 56 is distributed between rotating and stationary blade rows. The pressure drop across the rotating blade rows imparts a force (acting to the left in FIG. 1) which must be balanced in the opposite direction. This is the purpose of the high pressure dummy 80 and low pressure dummy 88. During steady-state operation of turbine 10, with rotor 12 rotating at 3600 revolutions per minute and with the temperature stabilized, the pressure in cavity 78 is typically 600 pounds per square inch (about 4.14 megapascals, abbreviated MPa) and the temperature of the superheated steam is typically 790° F. (421° C.). The pressure and temperature drop to perhaps 295 PSI (2.03 MPa) at 765° F. (407° C.) in intermediate pressure cavity 87, and to perhaps 75 PSI at 745° F. (401° C.) in cavity 62. The effective diameters of high pressure dummy 80 and low pressure dummy 88 are selected to minimize the total axial force on rotor 12, with any unbalanced force being transmitted to the thrust bearing.

Like all things mechanical, turbine 10 is subject to wear. In particular, the seal members 102 and 112 in FIG. 2, along with seal elements 122, are subject to a harsh environment which erodes the members 102 and 112 and elements 122. Furthermore, it has been found that the desire to bring generating capacity rapidly back on-line, after it has been shut down for some reason, occasionally leads operating personnel to pay less than full attention to manufacturers' specifications for bringing turbine 10 up to speed at a relatively modest pace. When this occurs the rotating elements are heated more rapidly than the stationary elements, and the resulting differences in thermal expansion may damage seal members 102 and 112, and seal elements 122. Because the differential expansion is greater in the axial direction than in the radial direction, damage to the seal elements 122 is usually more extensive. Both normal erosion and damage due to failure to follow start-up specifications results in increased leakage to the seals at the high pressure dummy 80 and low pressure dummy 88, thereby reducing efficiency of the turbine. Moreover, the leakage alters the pressure ratios across the high pressure dummy 80 and low pressure dummy 88, thereby increasing the axial flow along on rotor 12 and creating an undesirable noise problem.

One conventional way to repair the seals associated with dummies 80 and 88 is as follows: After upper and lower shells 20a and 20b have been removed, both the high pressure dummy 80 and the low pressure dummy 88 are machined to a common radius, illustrated by dotted line 132 in FIG. 1. This leaves a stub, and an annular element (not shown) having disk portions with the desired radii for dummies 80 and 88 is shrunk-on. That is, the annular element, with an inside diameter similar to the outside diameter of the stub, is heated to high temperatures and slipped over the stub, and then allowed to contract into firm engagement with rotor 12. Additionally, the seal rings 106 are removed from cylinder 20, and seal mounting portions 84 and 92 are machined, for example to the depth illustrated by dotted line 134 in FIG. 2. Unlike the situation with rotor 12, portions 84 and 92 need not be machined to the same radius. Thereafter, arcuate elements (not illustrated) having radially extending seals similar to seal members 102 are bolted onto what is left of portions 84 and 92. These seals cooperate with the shrunk-on disk portions, but it will be apparent that the repair procedure is labor-intensive, time-consuming, and requires the procurement of large forgings for the shrunk-on disks. Furthermore, the engineering effort to design the annular element is very significant.

In a variation on the above-described repair procedure, the high pressure dummy 80 is machined down to one depth and the low pressure dummy 88 is machined to a lesser depth (i.e., a larger diameter). Weld build-up is then employed to increase the radius at high pressure dummy 80 and at low pressure dummy 88 to the necessary level.

SUMMARY OF THE INVENTION

An object of the invention is to provide an improved labyrinth sealing arrangement.

Another object of the invention is to provide an improved labyrinth seal having radially disposed sealing elements which are mounted on a stationary component. A particular object of the invention is to provide sealing elements which are mounted by insertion of foot portions of the sealing elements into grooves in the stationary component.

Another object of the invention is to provide an improved seal having carrier rings, and rider rings which are mounted on the carrier rings and which have extending portions that cooperate with the rotating member.

Another object of the invention is to provide a method for installing the seal in equipment, and particularly steam turbines. A particular object of the invention is to remedy the shortcomings of the conventional seal and installation process as discussed above with respect to FIGS. 1 and 2.

In accordance with one aspect of the invention, these and other objects which will become apparent in the ensuing detailed description can be obtained by providing a seal that includes an arcuate carrier element which is mounted on a stationary member and which extends towards the axis of a rotating member, with the carrier element having an inner peripheral surface which is spaced apart from the rotating member by a gap. An arcuate rider element is also provided, the rider element having an extending portion. The rider element is mounted on the carrier element so that the rider element is spaced apart from the stationary member and so that the extending portion extends past the inner peripheral portion of the carrier element and toward the rotating member.

In accordance with another aspect of the invention, a first radial labyrinth sealing means includes a foot portion which is lodged in an annular groove in a stationary member. The first radial labyrinth sealing means also includes a peripheral surface which faces a cylindrical segment of the rotating member and which is spaced apart by a gap from the tip or apex periphery of a sealing element mounted at the cylindrical segment. The first radial labyrinth sealing means additionally includes a radially extending portion which extends past the peripheral surface and which has a tip or apex periphery that is has separated from the cylindrical segment by a gap, the periphery of the radially extending portion being closer to the axis of rotation than the periphery of the sealing element, so that the sealing element and the radially extending portion overlap. The seal additionally includes a second radial labyrinth sealing means of the same type, with an annular projection being provided on the rotating member between the first and second radial labyrinth sealing means.

In accordance with yet a further aspect of the invention, an axial labyrinth seal arrangement, in which seal projections having stepped side portions are disposed at intervals on a rotating member and seal rings which carry axially extending seal members to cooperate with the stepped side portions are mounted on the stationary member, includes the steps of removing the seal members from the stationary member. The seal projections are machined to remove at least one step from the stepped side portions, without entirely removing the seal members themselves and without appreciably changing the radius of cylindrical segments of the rotating member between the seal projections. Radial labyrinth seals are then mounted on the stationary member, each radial labyrinth seal carrying a radially extending portion which is spaced apart from the respective cylindrical segment of the rotating member by a narrow gap.

BRIEF DESCRIPTION OF THE DRAWINGS

FIG. 3 is a longitudinal cross-sectional view of a portion of the high pressure dummy, and is employed to illustrate a procedure for mounting a sealing element on the rotor of the turbine;

FIG. 4 is a longitudinal cross-sectional view of a portion of the high pressure dummy of the turbine, and illustrates radial labyrinth seals in accordance with a first embodiment of the present invention;

FIG. 5 is an exploded cross-sectional view through a carrier ring and rider ring in accordance with the first embodiment;

FIG. 6 is a cross-sectional view taken through a mounting groove in the housing shell above the high pressure dummy, and illustrates the procedure for mounting the radial labyrinth seal of FIG. 4;

DESCRIPTION OF THE PREFERRED EMBODIMENTS

Figure 1A:
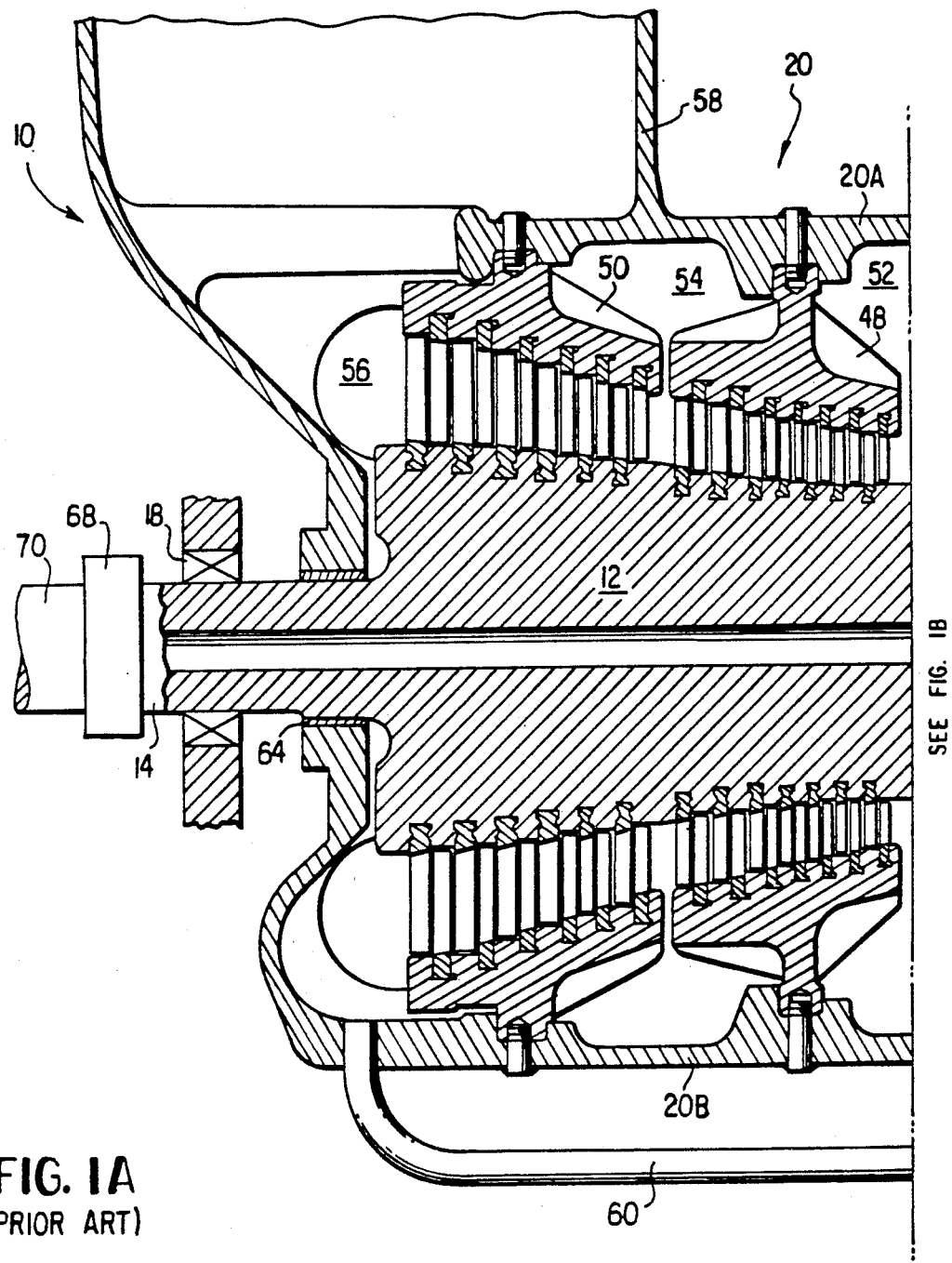
FIGS. 1A and 1B together are a longitudinal cross-sectional view through a steam turbine having conventional labyrinth sealing arrangements at the high pressure dummy and the low pressure dummy of the steam turbine, seal rings in the sealing arrangements not being illustrated in FIG. 1.

FIG. 4 illustrates radial labyrinth seals 150 in accordance with a first embodiment of the present invention. Familiarity with the foregoing discussion of FIGS. 1 and 2 will be assumed in the following detailed description.

Each seal 150 includes a semicircular carrier ring 152 having a foot portion 154 which is wedged into the groove 86 by caulking ring 110. Carrier ring 152 additionally has an inner peripheral surface 156. A seal element 122 is mounted on dummy 80 by caulking ring 124 and retaining ring 126. The tip or apex periphery of element 122 is spaced apart from surface 156 by about 20–30 mils (about 0.5 mm–0.8 mm). The intermediate portion of ring 152 is provided with an elongated slot 158 which receives the foot portion 160 of a semicircular radial seal segment 162 carried by ring 152, as shown in FIG. 5. Radial seal segment 162 is provided with a sloping shoulder portion 164 and a pair of seal flanges or projections 166 which are spaced apart by a gap 167. Ring 152 and seal segment 162 are made of the same metal as portion 84. The tips or apex peripheries of projections 166 are spaced apart from dummy 80 by about 20–30 mils (about 0.5 mm–0.8 mm). Seals segments 162 face toward annular projections 168.

In operation, superheated steam in cavity 78 flows between the tip of seal member 102 and the peripheral edge portion 96 of projection 168. Sloping shoulder portion 164 minimizes downward force on seal segment 162 due to the incoming steam and reduce stagnation which would otherwise occur, factors which are significant in the seal 150 closest to cavity 78 but less important in the subsequent seals 150. The incoming steam is restrained by projections 166 and seal element 122, and is then guided between carrier ring 152 and projection 168 to the next seal 150.

Figure 1B:
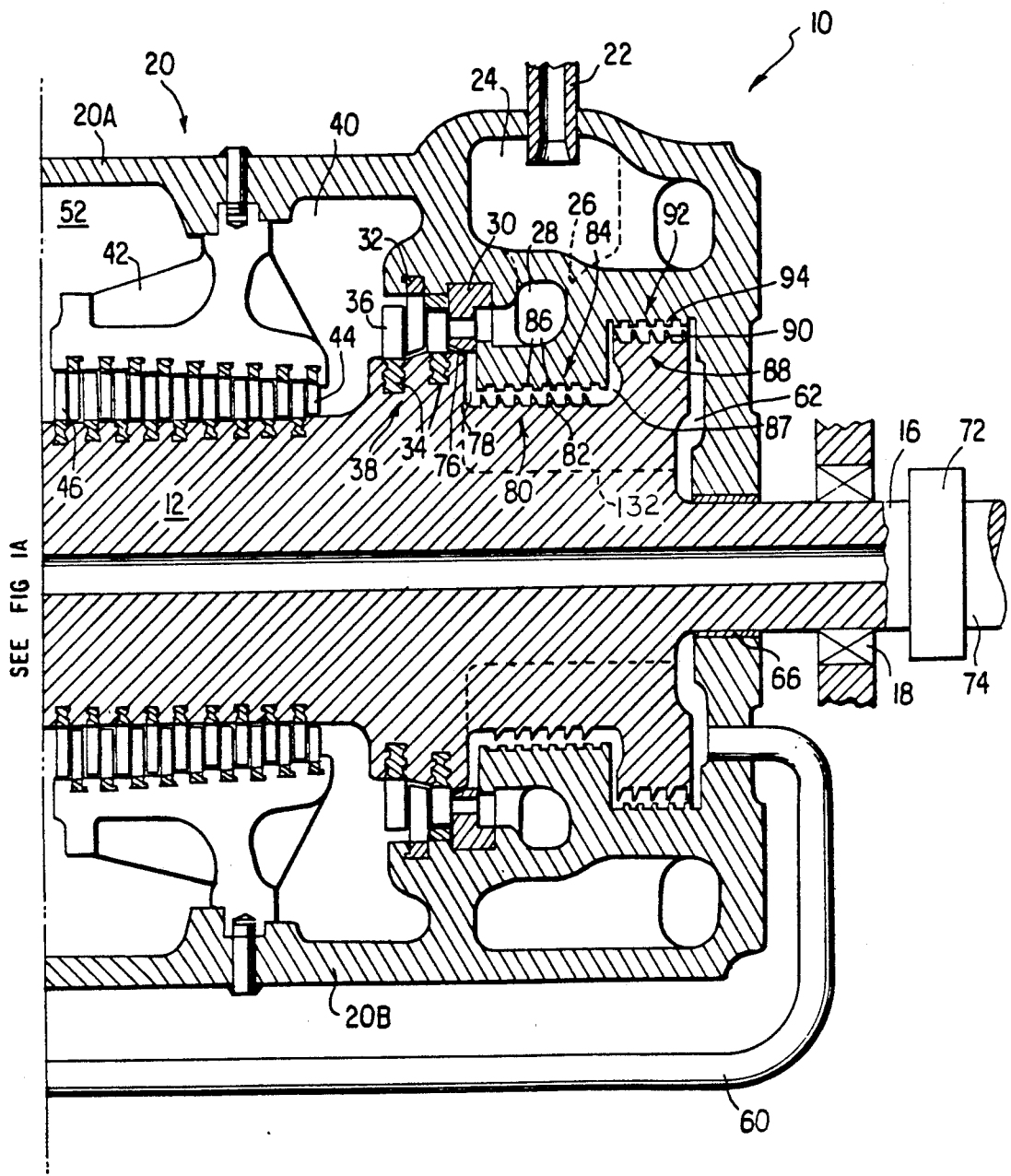
Figure 2:
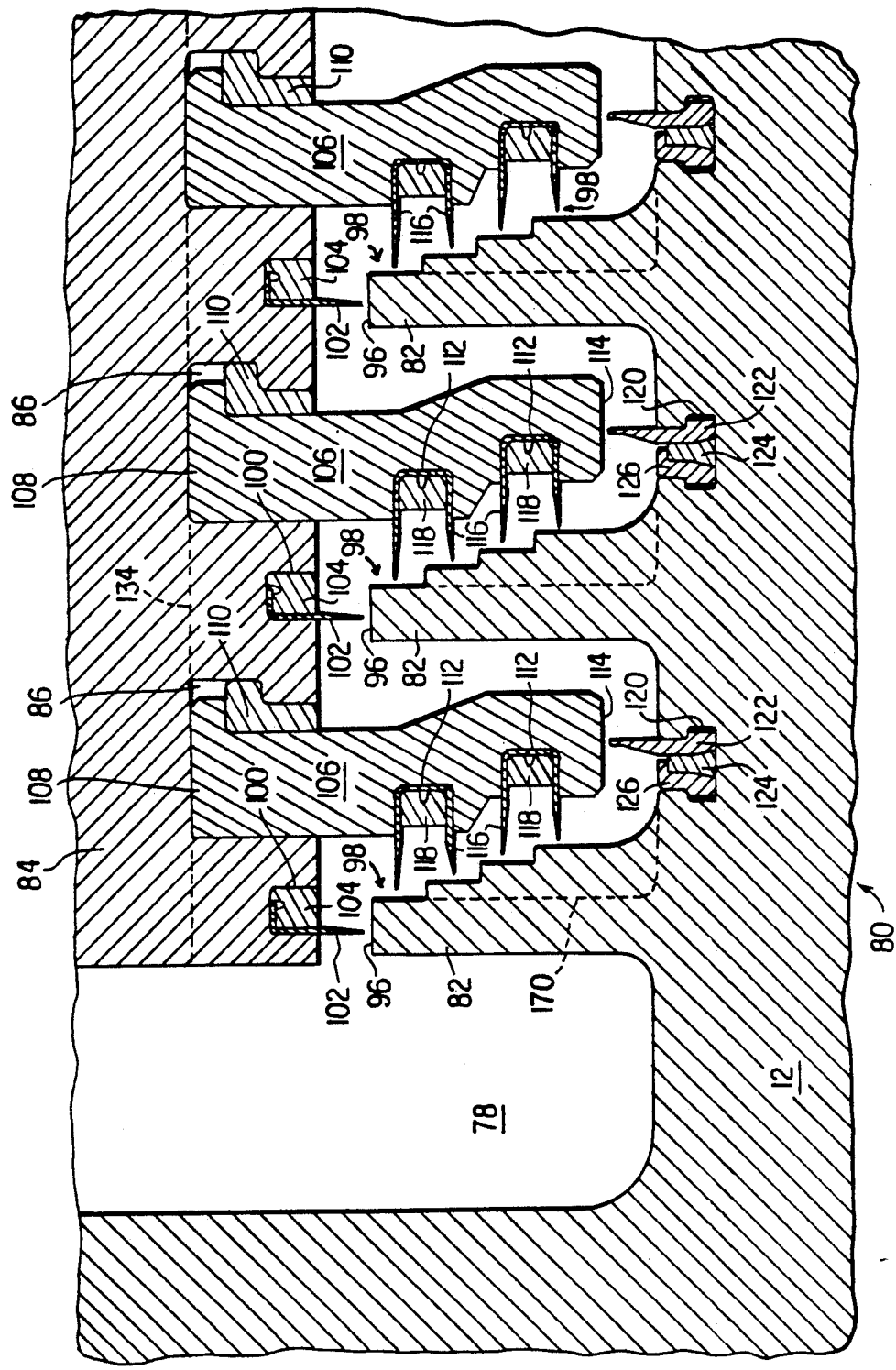
FIG. 2 is a longitudinal cross-sectional view through a portion of the conventional labyrinth sealing arrangement at the high pressure dummy of the turbine of FIG. 1.

Radial labyrinth seals 150 can of course be used in new equipment such as a turbine of the type illustrated in FIG. 1. The advantages of seals 150 become particularly valuable, however, when they are used as replacement seals. A replacement procedure will now be discussed with reference to FIGS. 1, 2, and 4.

After cylinder 20 has been removed, a lathe is used to machine away caulking elements 124. This permits seal elements 122 and retaining rings 126 to be removed from grooves 120. Dummies 80 and 88 are not machined down to the depth illustrated by dotted line 132, but are instead kept at their original depths. However, a lathe is used to remove the stepped side portions 98 of the projections 82, as illustrated by dotted lines 170. This leaves the projections 168 shown in FIG. 4.

Nor is the seal mounting portion 84 machined away to the depth illustrated by dotted line 134. Instead, caulking rings 104 and seal rings 106 are removed, leaving the grooves 86 and 100. Although the seal rings 106 may be removed in a manner in which destroys them, they can be removed whole for a purpose to be described later. This can be done by machining the caulking rings 110 away.

After the original sealing elements have been removed and the projections 82 have been machine to provide the modified projections 168, new sealing elements 122 are mounted in the grooves 120 in the manner previously discussed with respect to FIG. 3. New seal members 102 and caulking rings 104 are also installed in the grooves 100.

FIG. 6 is a sectional view through a portion of the upper cylinder shell 20A, for example, the plane of the section extending through a groove 86. The orientation of the sectional plane is such that cavity 78 would be below the surface of the drawing, and low pressure dummy 88 would be above the surface. A carrier ring 152 with a radial seal segment 162 attached (or, rather a semicircular carrier element and attached seal segment, two of such carrier elements and seal segments being needed for a complete carrier ring and radial seal segment) is positioned at the entrance of the groove 86 and then rotated in the direction of arrow 172 until the ring 152 is fully inserted. Caulking ring 110 is inserted in a similar manner. It will be apparent that the radial seal segment 162 may be inserted into the slots 158 of the carrier rings 152 using a technique similar to that shown in FIG. 6.

Figure 7:
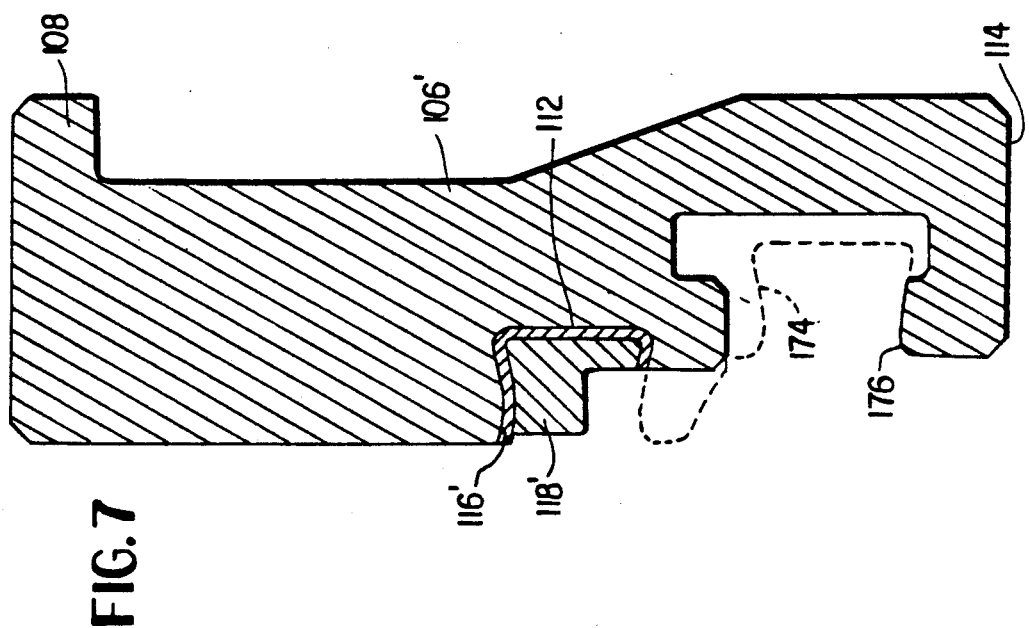
FIG. 7 is a cross-sectional view through a conventional seal ring after it has been modified for use as a carrier ring.

If the original seal rings 106 were not destroyed when they were removed, they can be re-machined for use as carrier rings in accordance with the present embodiment. FIG. 7 illustrates a carrier ring 106' in which a portion 116' of an original seal member 116 remains, along with a portion 118' of an original caulking ring 118. It should be noted that the base of the groove 112 is slightly widened (although this widening is not illustrated in FIG. 2 in order to simplify the drawing), which prevents portions 116' and 118' from becoming dislodged. Dotted line 174 illustrates further portions of the original seal ring 106 which are removed As a result of these modifications, carrier ring 106' has the same configuration as carrier ring 152' except for slight differences at chin region 176.

Figure 8:
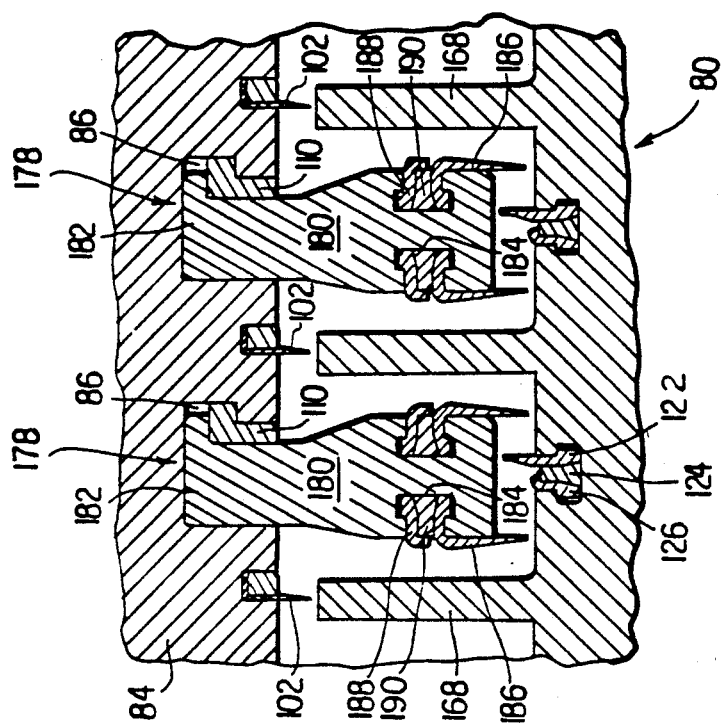
FIG. 8 is a longitudinal cross-sectional view through a portion of the high pressure dummy, and illustrates radial labyrinth seals in accordance with a second embodiment of the invention.

A second embodiment of the invention is illustrated in FIG. 8, which shows a pair of radial labyrinth seals 178. Seals 178 include carrier ring 180 having foot portions 182 which are lodged in grooves 86. In the sides of rings 180 are elongated grooves 184. Radial seal elements 186 are lodged in grooves 184, along with caulking rings 190 and retainer rings 188. Seal elements 186, caulking rings 190, and retainer rings 188 190 can be installed in the manner illustrated in FIG. 3. If desired, a single caulking member (not illustrated) can be used in lieu of a caulking holder 188 and caulking ring 190. It should be noted that the seals 178 have seal elements 186 on either side of seal element 120, while in the seals 150 (FIG. 4) two seal projections 166 were positioned on the same side. Other modifications in the placement of the radially extending sealing members are of course within the scope of the present invention.

While the present invention has been described with respect to radial labyrinth seals employed at the high pressure dummy 80 of a turbine, it will be apparent that only the radii of the seals 150 and 178 would need to be changed in order to use them at the low pressure dummy 88. Moreover, the present invention is not limited to use in steam turbines, but may instead be used in other equipment where a reliable and easily replaceable seal is needed. The seal could be used in pumps, for example, or in other rotating equipment such as combustion turbines, compressors, and any turbo machinery with a differential pressure across the shaft.

It should be pointed out that the primary benefit from converting from "axial" to "radial" seals is a decrease in the sensitivity to axial differential expansion due to greatly increased axial clearance between rotating and stationary parts. This eliminates axial rubbing and resulting seal damage. The turbine thermal performance and proper thrust balance of the rotor are thereby maintained.

It will be understood that the above description of the present invention is susceptible to various modifications, changes, and adaptations, and the same are intended to be comprehended within the meaning and range of equivalents of the appended claims.

I claim:

1. A seal for use between a stationary member having an opening and a rotating member which extends through the opening, said seal comprising:

an arcuate carrier element which is mounted on the stationary member and which extends toward the axis of the rotating member, the carrier element having first and second radially extending sides and an inner peripheral surface between the sides, the inner peripheral surface being spaced apart from the rotating member by a gap, the first side of the carrier element being exposed to a higher side of the carrier element being exposed to a higher pressure than the second side, the first side of the carrier element having an elongated slot therein;

an arcuate seal element having an extending portion; and means in the slot for mounting the seal element on the carrier element so that the seal element is spaced apart from the stationary member and so that the extending portion extends past eh inner peripheral surface of the carrier element and toward the rotating member, wherein the means for mounting includes a foot portion affixed to the seal element, the foot portion extending into the slot.

2. A seal for use between a stationary member having an opening and a rotating member which extends through the opening, said seal comprising:

an arcuate carrier element which is mounted on the stationary member and which extends toward the axis of the rotating member, the carrier element having first and second radially extending sides and an inner peripheral surface between the sides, the inner peripheral surface being spaced apart from the rotating member by a gap, the first side of the carrier element being exposed to a higher pressure than the second side, the first side of the carrier element having an elongated slot therein;

an arcuate seal element having an extending portion; and means in the slot for mounting the seal element on the carrier element so that the seal element is spaced apart from the stationary member and so that the extending portion extends past the inner peripheral surface of the carrier element and toward the rotating member, wherein the means for mounting includes a foot portion affixed to the seal element, the foot portion extending into the slot.

3. The seal of claim 1, wherein the first side of the carrier element has a flat surface region adjacent the slot, and wherein the seal element has a sloping shoulder portion adjacent the flat surface, the sloping shoulder portion facing away from the carrier element.

4. The seal of claim 1, wherein the stationary member has a groove which faces the rotating member, and wherein the carrier element has a foot portion which extends into the groove.

5. The seal of claim 1, wherein the extending portion of the seal element is spaced apart from the rotating member by a gap.

6. A seal for use between a stationary member having an opening and a rotating member which extends through the opening, said seal comprising:

an arcuate carrier element which is mounted on the stationary member and which extends toward the axis of the rotating member, the carrier element having first and second radially extending sides and an inner peripheral surface between the sides, the inner peripheral surface being spaced apart from the rotating member by a gap, the first side of the carrier element being exposed to a higher pressure than the second side, the first side of the carrier element having an elongated slot therein;

an arcuate seal element having an extending portion; and means in the slot for mounting the seal element on the carrier element so that the seal element is spaced apart from the stationary member and so that the extending portion extends past the inner peripheral surface of the carrier element and toward the rotating member, wherein the seal element is a generally L-shaped member having a portion which extends into the slot and having another portion which provides the extending portion of the seal element, and wherein the means for mounting includes at least one caulking member in the slot.

7. The seal of claim 6, wherein the carrier element has another elongated slot in the second side, and further comprising another generally L-shaped member having a portion which extends into the another slot and having a portion which extends past the inner peripheral surface of the carrier element toward the rotating member, and at least one caulking member in the another slot.

8. A seal for use between a stationary member having an opening and a rotating member which extends through the opening, said seal comprising:

an arcuate carrier element which is mounted on the stationary member and which extends toward the axis of the rotating member, the carrier element having first and second radially extending sides and an inner peripheral surface between the sides, the inner peripheral surface being spaced apart from the rotating member by a gap, the first side of the carrier element being exposed to a higher pressure than the second side, the first side of the carrier element having an elongated slot therein;

an arcuate seal element having an extending portion, the extending portion of the seal element being spaced apart from the rotating member by a gap; and means in the slot for mounting the seal element on the carrier element so that the seal element is spaced apart from the stationary member and so that the extending portion extends past the inner peripheral surface of the carrier element and toward the rotating member, wherein the rotating member has a seal projection with a peripheral surface which faces the stationary member and which is spaced apart from the stationary member by a gap, the carrier element being disposed adjacent the seal projection, the distance between the peripheral surface of the seal projection and the axis of the rotating member being greater than the distance between the inner peripheral surface of the carrier element and the axis of the rotating member.

9. The seal of claim 8, wherein the rotating member has another seal projection with a peripheral surface which faces the stationary member and which is spaced apart from the stationary member by a gap, the distance between the peripheral surface of the another seal projection and the axis of the rotating member being greater than the distance between the inner peripheral surface of the carrier element and the axis of a rotating member, and further comprising another arcuate carrier element which is mounted on the stationary member and which extends toward the axis of the rotating member, the another carrier element having an inner peripheral surface which is spaced apart from the rotating member by a gap, another arcuate seal element having an extending portion, and means for mounting the another seal element on the another carrier element so that the another seal element is spaced apart from the stationary member and so that the extending portion of the another seal element extends past the inner peripheral portion of the another carrier element and toward the rotating member, and wherein the another seal projection is disposed between the carrier element and the another carrier element.

10. The seal of claim 9, wherein the rotating member comprises the rotor of a turbine and the stationary member comprises a housing of the rotor.

11. A seal for use between a stationary member having an opening and a rotating member which extends through the opening, the rotating member having first and second cylindrical portions which face the stationary member and having an annular seal projection with a periphery, the first and second cylindrical portions being disposed on either side of the annular seal projection and having respective radii which are substantially equal and which are less than the radius of the periphery of the annular seal projection, the rotating member additionally having first and second annular sealing members which extend respectively from the first and second cylindrical portions and which have peripheries with substantially the same radius, the radius of the peripheries of the first and second sealing members being greater than the radius of the cylindrical portions but less than the radius of the annular seal projection, the stationary member having a first annular groove which faces the first cylindrical portion and a second annular groove which faces the second cylindrical portion, said seal comprising:

first radial labyrinth sealing means for creating a seal between the rotating and stationary members, the first radial labyrinth sealing means including a first arcuate carrier element having a foot portion which is lodged in the first annular groove, the first carrier element additionally having first and second radially extending sides and a peripheral surface between the sides, the peripheral surface of the first carrier element facing the first cylindrical portion and being spaced apart from the periphery of the first sealing member by a gap, the first side of the first carrier element being exposed to a higher pressure than the second side of the first carrier element, the second side of the first carrier element facing the annular seal projection, the first radial labyrinth sealing means further including a first arcuate seal element mounted on the first side of the first carrier element, the first seal element having a radially extending portion which extends past the peripheral surface of the first carrier element and which has a periphery that is separated from the first cylindrical portion by a gap, the periphery of the radially extending portion of the first seal element being disposed at a radius that is smaller than the radius of the periphery of the first sealing member; and second radial labyrinth sealing means for creating a seal between the rotating and stationary members, the second radial labyrinth sealing means including a second arcuate carrier element having a foot portion which is lodged in the second annular groove, the second carrier element additionally having first and second radially extending sides and a peripheral surface between the sides of the second carrier element, the peripheral surface of the second carrier element facing the second cylindrical portion and being spaced apart from the periphery of the second sealing member by a gap, the first side of the second carrier element being exposed to a higher pressure than the second side of the second carrier element, the first side of the second carrier element facing the annular seal projection, the second labyrinth sealing means further including a second arcuate seal element mounted on the first side of the second carrier element, the second seal element having a radially extending portion which extends past the peripheral surface of the second carrier element and which has a periphery that is separated from the second cylindrical portion by a gap, the periphery of the radially extending portion of the second seal element being disposed at a radius that is smaller than the radius of the periphery of the second sealing member.

12. The seal of claim 4, wherein the rotating member additionally has a pair of further annular seal projections having substantially the same radius, the annular seal projections and the further annular seal projections having substantially the same radius, the first and second radial labyrinth sealing means being disposed between the further annular seal projections.

13. The seal of claim 11, wherein the first side of the first carrier element has an elongated slot therein, and wherein the first arcuate seal element has a foot portion which fits into the slot.

14. The seal of claim 13, wherein the radially extending portion of the first seal element is a seal projection, and wherein the first seal element further comprises an additional seal projection, the seal projection and additional seal projection being separated by a gap.

15. The seal of claim 13, wherein the first side of the first carrier element has a flat region adjacent the slot, and wherein the first seal element has a sloping shoulder adjacent the flat region, the sloping shoulder facing away from the first carrier element and being disposed at an obtuse angle with respect to the flat region.

16. The seal of claim 11, wherein the first side of the first carrier element has an elongated slot therein, wherein the first arcuate seal element comprises a generally L-shaped seal element having a portion which is disposed in the slot, the radially extending portion of the first seal element being connected to the portion which is disposed in the slot, and wherein the first radial labyrinth sealing means further comprises at least one caulking member in the slot.

17. The seal of claim 16, wherein the second side of the first carrier element has another elongated slot therein, and wherein the first radial labyrinth sealing means further comprises another generally L-shaped seal element having a portion disposed in the another slot and having a portion which extends radially toward the first cylindrical portion, and at least one caulking member in the another slot.

18. The seal of claim 11, wherein the rotating member comprises the rotor of a steam turbine and the stationary member comprises a housing for the rotor.

* * * * *